Dec. 9, 1958

M. C. MURRELL 2,863,419

CREEP FEEDERS

Filed Nov. 1, 1955

INVENTOR.
Merwyn C. Murrell
BY
Ralph L. Bassett
Attorney

Dec. 9, 1958   M. C. MURRELL   2,863,419
CREEP FEEDERS
Filed Nov. 1, 1955   4 Sheets-Sheet 4

INVENTOR.
Merwyn C. Murrell
BY
Attorney

United States Patent Office 2,863,419
Patented Dec. 9, 1958

2,863,419

CREEP FEEDERS

Merwyn C. Murrell, Durant, Okla., assignor to Excel Body Corporation, Durant, Okla.

Application November 1, 1955, Serial No. 544,106

9 Claims. (Cl. 119—20)

This invention relates to improvements in creep feeders and contemplates the provision of an all-metal structure which will retain the feed against all weather conditions and discharge a predetermined amount of feed to the feed troughs.

One of the objects of the invention is to provide an all-metal feeder housing with an all-metal sled structure which can be attached to the housing to facilitate transportation thereof.

Another object of the invention is to provide a feed container in which the troughs are available for adjustment permitting animals of predetermined size to feed and preventing larger animals from feeding.

Another object of the invention is the provision of a feed hopper in which the top surfaces are all pitched at an angle to facilitate the drainage of water.

One of the main objects of the invention is to provide in association with the hopper and the skids for the hopper, a pen structure which is associated therewith and so constructed and arranged as to permit telescopic movement of the pen with respect to the feeder, whereby the parts can be made into a compact unit for shipment or transportation.

Another object of the invention is the provision of a sectional pen structure which can be reversed as well as telescoped with respect to the hopper, and when reversed, and attached to the hopper provides a single compact assembly for transportation and shipment.

A still further object is the provision of an assembly which is cheap to manufacture, suitable for use under all weather conditions, will maintain feed in a dry condition, is capable of adjustment to permit use of the feed by only selected animals, and can be readily assembled for transportation and/or use to carry out its intended functions.

Further objects of the invention will more clearly hereinafter appear by reference to the accompanying drawings forming a part of the instant application, wherein like characters of reference designate corresponding parts throughout the several views, in which.

Figure 1:
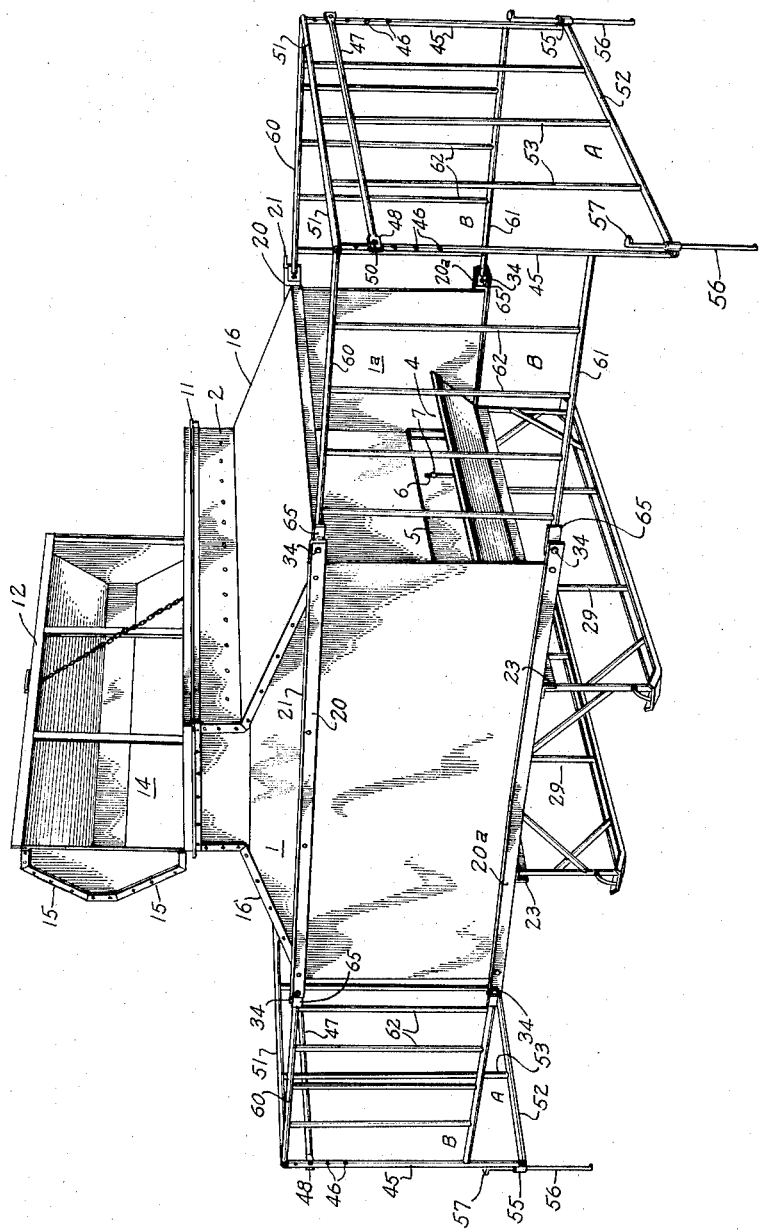
Fig. 1 is a perspective view showing the pen lowered for use in feeding.

The feed container or hopper is shown as of generally rectangular form embodying end walls 1 and side walls 2, the hopper having discharge openings 3 adjacent which the feed troughs 4 are positioned. Vertically adjustable gates 5 are provided, these gates being slotted at 6 to receive bolts 7 and permitting adjustment of the gates to control the discharge of feed from the hopper to the troughs. The top opening 10 of the hopper is provided with flanges 11 to receive the flanges 12 of the bin lid 14, the bin lid 14 having downwardly sloping faces 15 to provide suitable drainage. The roof sheets 16 of the main hopper structure extend outwardly of the hopper a sufficient distance to prevent water entering the feed troughs 4. Likewise the end walls 1 of the hopper structure project substantially outwardly beyond the feed troughs as at 1ª, thus enclosing the feed troughs except for one open side and fully protecting these troughs from weather conditions.

Figure 4:
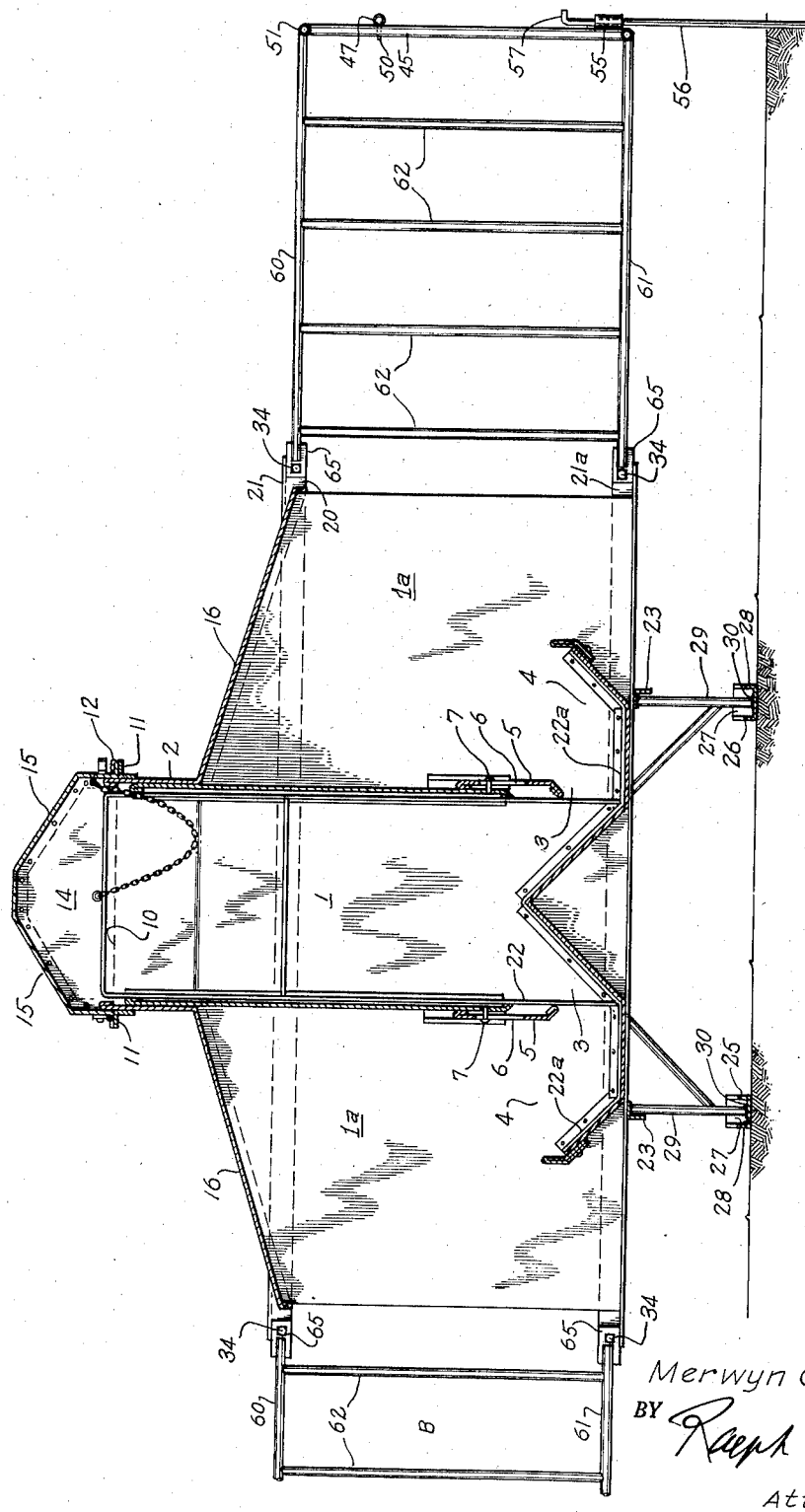
Fig. 4 is an enlarged transverse sectional view through the center of the assembly.

A pair of transversely extending upper and lower end braces 20 and 20ª are provided at each end wall 1 of the hopper structure. The upper end braces 20 have their vertical flanges fixed to the end faces of the end wall of the hopper and their upper horizontal flanges 21 extending outwardly therefrom and formed with spaced bolt openings. The lower transverse braces 20ª have their horizontal flanges extending under the bottom ends of the hopper and their vertical flanges abutting the end walls of the hopper. It will be understood that the feed hopper is formed with overlapping reinforcing flanges at all points of connection between the various parts forming the hopper structure. This flanging of the sheets provides a reinforcement lending rigidity to the assembly. Likewise end frames 22 of the general contour of the bin structures are shown in Fig. 4, one of these frames 22 being located at each end and within the container to give support and rigidity to the assembly. These brace frames 22 include arms 22ª which cooperate with the troughs 4 and conform to the inner surfaces of the troughs to reinforce the same.

Figure 2:
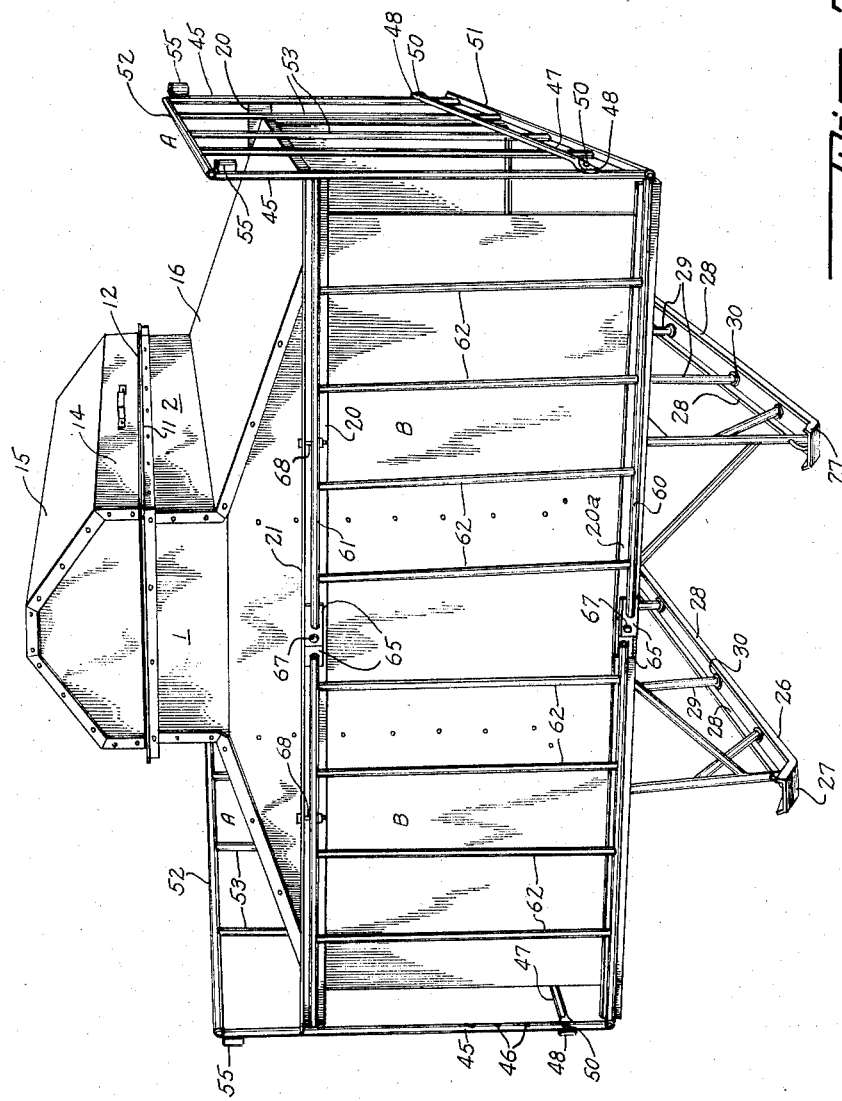
Fig. 2 is an enlarged perspective view showing the pen structure reversed and elevated and telescoped for shipment.
Figure 3:
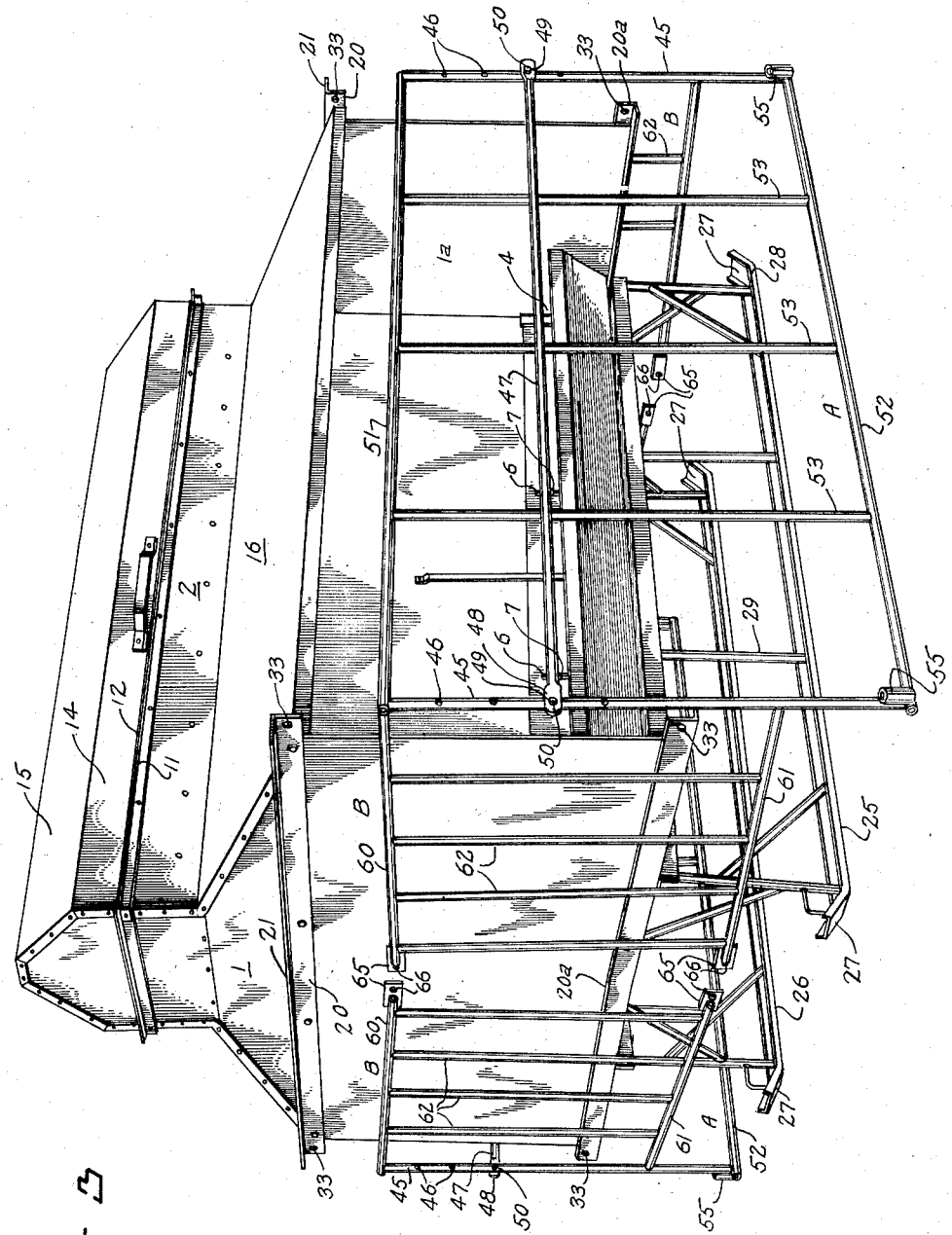
Fig. 3 is an enlarged perspective view showing the pen sections telescoped but not reversed.

The skid frame is formed of a pair of spaced runners 25 and 26 of generally U-form in cross-section, including relatively wide base portions 27 and upright side walls 28 (Fig. 2). Both ends of each runner are reduced in width and gradually taper outwardly and upwardly as best shown in Fig. 3, so that these runners are capable of sliding or skidding in either direction without interference from obstructions on the surface over which they may be traveling. A plurality of vertical posts 29 may be welded at their bases 30 (Fig. 4) to the runners 25 and 26. The number of these posts may be varied, it being understood that the number will be ample to provide rigid support for the top skid angles 23, these angles 23 having their vertical flanges positioned outwardly and their horizontal flanges projecting inwardly for engaging the transverse lower end angles 20ª positioned at each end of the hopper. These vertical flanges of the lower braces 20ª are provided with bolt openings 33 for receiving bolts 34 for connection with the pen sections, as shown in Fig. 4. It will be obvious that the skid structure can be readily attached to any one of a number of feed hoppers or may be a permanent part thereof should it be desirable to skid the feed hoppers to different locations.

The pen structure is formed of metallic tubing and includes side panels A and end panels B. The side panels A include end posts 45 formed with a plurality of spaced bolt openings 46 transversely aligned for receiving the rod element 47 having flat extremity 48 with bolt openings 49 for the passage of bolts 50, whereby this rod can be adjusted to any vertical position for regulating the feeding of animals of different sizes to be hereinafter set forth. The end posts 45 are connected by upper and lower horizontal tubes or rods 51 and 52 and spaced vertical braces 53 are provided connecting these horizontal rods 51 and 52 and providing partitions between which the separate animals can enter into feeding position. The bases of the side panels A are provided with fixed vertical tubular sections 55 for receiving anchor pins 56, the latter extending through the tube sections 55 and into the ground a suitable distance to hold the frame rigid in any desired adjusted position. The upper end of the pin 56 is bent outwardly as at 57 to provide an area for gripping or hammering the pin into the ground. The end panels B each include upper and lower horizontal frame members 60 and 61 and a plurality of spaced connecting uprights 62 providing a rigid framework and these end frames are so spaced with respect to the structure that they snugly engage the end walls 1 of the hopper and are positioned beneath and cooperate with the projecting flange of the flanged braces 20 of the hopper structure. The ends of the horizontal frame members 60 and 61 include flat plate-like portions 65 formed with openings 66 for receiving connecting bolts 67, whereby the two adjacent side frames can be secured together by connecting these plates either with link means or with a bolt when the bolt openings overlap as shown in Fig. 2. The use of this structure will be apparent from an inspection of Fig. 2 in which the paneling or framing is reversed and telescoped with respect to the hopper and then locked together at points of overlapping of the plate portions 65 by bolts 67 and by vertical bolts 68 extending through the angle brace 20 and through the lower horizontal brace 61.

The feeding position is shown in Fig. 1 and in this position it will be noted that the frames have been appropriately expanded with respect to each other and relative to the hopper to a position required by the feeding of animals of a certain size. At the same time the adjusting rods 47 have been moved to a predetermined position so that feed will be available to animals of a desired size but not available to animals of other sizes. In this position the flat plates at the ends of the frame B of the pen sections may be connected by bolts to give support to the frames, as shown in Fig. 1.

In Fig. 2 these frames have been reversed and telescoped together, with the flat ends 65 of the end frames overlapping and bolted together and with the bottom horizontal end frame members 61 supported by the vertical bolts 68 going through the end frame members 20 of the hopper. In this latter position it will be obvious that the entire structure will occupy practically the same amount of space as is occupied by the feed hopper alone and thus substantial space is saved in shipment of the assembly. Also this arrangement is quite appropriate for skidding the feed hopper from one location to another as the pen sections are held out of contact with the ground and will not be subject to breakage and distortion by such contact. When the feed hopper reaches the desired location the pen sections are readily detached and adjusted with respect to the hopper and then fixed in position by the fixing pins 56 going through the tube 55 at each corner of the pen section. The pens are thus held in fixed position with respect to the hopper and the hopper is then available only to cattle of certain predetermined size for feeding.

What I claim is:

1. A feeding device for animals comprising a hopper having top, bottom, side and end walls, said top having an opening with a closure applied thereto, a feed trough along one side of said hopper having communication with the interior of said hopper, a pen structure including three animal-retaining panel members, two of which are connected at one of their ends to said hopper and at the other of their ends to the ends of the third panel, the dimensions of said panel members being slightly in excess of those of corresponding sides of said hopper, whereby the same may be placed in embracing position about the hopper for storage purposes.

2. The invention as claimed in claim 1, the said end portions being spaced to snugly embrace in telescopic association end wall portions of said hopper, the side of each pen section being provided with spaced vertical bars and a transversely extending horizontal rod element, said rod element being vertically adjustable to regulate the height of the feed openings defined by the vertical bars, means for connecting the ends of each pen section at each end of the hopper, and fastening means for securing the bottom portion of each pen to the upper inner portion of the end walls of the hopper when the pen sections are reversed and telescoped for elevating the pen sections for transportation.

3. The invention as claimed in claim 1, the sled structure for the hopper consisting of runners, vertical post members extending upwardly from the runners, longitudinally extending rail members supported at the top of the posts and adapted to be connected to the bottom of the hopper beneath said feed troughs, an angle shaped end member at each end of each of said rail members, said angle shaped end members facing inwardly and adapted to engage the hopper at the junction of the end walls and the bottom, and means for fixing the angle members to the hopper.

4. The invention as claimed in claim 1, the sled structure for the hopper consisting of runners, vertical post members extending upwardly from the runners, longitudinally extending rail members supported at the top of the posts and adapted to be connected to the bottom of the hopper beneath said feed troughs, an angle shaped end member at each end of each of said rail members, said angle shaped end members facing inwardly and adapted to engage the hopper at the junction of the end walls and the bottom, means for fixing the angle members to the hopper, a pen section for each side of said hopper, each section including sides and end walls, said end walls being adapted to embrace the end walls of said hopper in telescopic association, means for connecting the end walls of said pen sections together at each end of the hopper when in telescoped position, and means for suspending the pen sections to the upper portion of said hopper when their ends are connected together for lifting said pen sections, whereby movement of the hopper on its sled structure will simultaneously transport the pen sections.

5. The invention as claimed in claim 1 having horizontally arranged angle braces at the upper portions of the ends of the hopper, said angle braces each having a flange projecting horizontally outwardly from the ends of the hopper structure, a pen structure formed in sections and adapted to telescopically receive said hopper and to embrace the same, and means connecting said pen sections to the outwardly projecting horizontal flanges at the end of the hopper.

6. The invention as claimed in claim 1 having horizontally arranged angle braces at the upper portions of the ends of the hopper, said angle braces each having a flange projecting horizontally outwardly from the ends of the hopper structure, panels at each side of said hopper formed of a plurality of spaced uprights defining head openings for animals, a transverse member extending across said spaced uprights and being adjustable vertically with respect thereto to regulate the height of the feed openings, and members extending from each end of the panels adapted to be secured to the ends of the hopper for securing the parts in fixed position.

7. The invention as claimed in claim 1, the pen sections each including side and end portions adapted to telescopically embrace the ends of the hopper, said pen sections being reversible from their feeding position to a carrying position and being adapted when reversed to carrying position to be fixed to the upper portion of said hopper with their ends connected together.

8. The structure of claim 1 characterized in that each pen section consists of a side panel formed of spaced vertical uprights and end panels fixed thereto, the end panels being of less height than the side panels and being positioned at the lower portion of said side panels when the latter is in feeding position.

9. The structure of claim 1 characterized in that each pen section consists of a side panel formed of spaced vertical uprights and a horizontal transversely positioned barrier member and the end panels are of less height than the side panels and are positioned at the upper portion of the side panels when the latter is in carrying position.

References Cited in the file of this patent

UNITED STATES PATENTS

| | | |
|---|---|---|
| 608,863 | Innis | Aug. 9, 1898 |
| 829,611 | Turner | Aug. 28, 1906 |
| 1,121,502 | Hornbeck | Dec. 15, 1914 |
| 1,468,205 | Julian | Sept. 18, 1923 |
| 1,827,075 | Doane | Oct. 13, 1931 |
| 2,454,721 | Severance et al. | Nov. 23, 1948 |
| 2,708,901 | Adams | May 24, 1955 |